(12) United States Patent
Gibbons

(10) Patent No.: US 9,319,509 B2
(45) Date of Patent: Apr. 19, 2016

(54) SYSTEM FOR CONTROL AND OPERATION OF ELECTRONIC DEVICES

(71) Applicant: Peter Gibbons, Carson City, NV (US)

(72) Inventor: Peter Gibbons, Carson City, NV (US)

(*) Notice: Subject to any disclaimer, the term of this patent is extended or adjusted under 35 U.S.C. 154(b) by 78 days.

(21) Appl. No.: 14/229,899

(22) Filed: Mar. 29, 2014

(65) Prior Publication Data

US 2014/0213319 A1 Jul. 31, 2014

Related U.S. Application Data

(63) Continuation of application No. 13/186,467, filed on Jul. 19, 2011, now abandoned.

(60) Provisional application No. 61/386,114, filed on Sep. 24, 2010.

(51) Int. Cl.
| H04R 1/10 | (2006.01) |
| H04M 1/725 | (2006.01) |
| H04R 1/08 | (2006.01) |
| H04M 1/60 | (2006.01) |

(52) U.S. Cl.
CPC ........ *H04M 1/72527* (2013.01); *H04M 1/6058* (2013.01); *H04R 1/08* (2013.01); *H04R 1/1041* (2013.01)

(58) Field of Classification Search
CPC ... H04R 1/1041; H04R 1/1058; H04R 1/1066
USPC ............... 381/74, 374–375, 384; 379/420.04, 379/433.06
See application file for complete search history.

(56) References Cited

U.S. PATENT DOCUMENTS

| 5,678,205 A * | 10/1997 | Gray ........................ A42B 3/10 455/348 |
| 5,818,946 A * | 10/1998 | Walter .......................... 381/321 |
| 6,608,908 B1 * | 8/2003 | Galet et al. ..................... 381/376 |
| 2001/0012373 A1 * | 8/2001 | Graumann ............. H04R 5/023 381/364 |
| 2004/0207611 A1 * | 10/2004 | Hirobe ................... G09G 5/003 345/204 |
| 2006/0088178 A1 * | 4/2006 | Whelen ........................ 381/301 |
| 2007/0273671 A1 * | 11/2007 | Zadesky et al. ................ 345/173 |
| 2008/0188137 A1 * | 8/2008 | Goetz et al. ..................... 439/669 |
| 2011/0164758 A1 * | 7/2011 | Hestehave .......... H04M 1/6066 381/74 |

* cited by examiner

*Primary Examiner* — Ahmad F Matar
*Assistant Examiner* — Katherine Faley
(74) *Attorney, Agent, or Firm* — D. C. Williams

(57) ABSTRACT

The present invention relates to an apparatus and method to permit control and operation of an electronic device while participating in another activity, including a variety of sports and recreational activities. A fabric helmet liner, one or more speakers, a microphone, a breakaway connector, and a slap switch are provided and configured to enhance the ability of users to answer or end telephone calls or start, stop, or resume audio output t the speakers while a user is in motion or wearing gloves that would render the use of conventional call answer buttons difficult or impossible.

20 Claims, 6 Drawing Sheets

SYSTEM FOR CONTROL AND OPERATION OF ELECTRONIC DEVICES

CROSS-REFERENCE TO RELATED APPLICATIONS

This application is a Continuation of pending U.S. Nonprovisional Patent Application No. 13/186,467, filed on Jul. 19, 2011 and entitled "Sports MusiCom Headset". Said application claimed benefit of U.S. Provisional Application No. 61/386,114, filed on Sep. 24, 2010 and entitled "Sports MusiCom Headset". The instant application is commonly owned with, claims the benefit of, and incorporates herein by reference both of the applications enumerated above in their entireties. In this regard, in the event of inconsistency between anything stated in this specification and anything incorporated by reference in this specification, this specification shall govern.

FIELD OF THE INVENTION

The present invention relates to stereophonic cellular telephone headset systems, specifically to systems adapted for use in conjunction with a variety of sports and recreational activities, and providing a means for connecting external speakers and microphones to cellular telephones.

BACKGROUND OF THE INVENTION

When communicating through a cellular telephone, it is often desirable, for convenience and safety purposes, to utilize external speakers and microphones.

The external devices are connected to the cellular telephone either by wires or through wireless communication. These devices allow the user to communicate without having to hold the cellular telephone next to their ear, which would otherwise be necessary to allow the speaker and microphone to function properly. The user's hand, which would normally be used to hold the cellular telephone, is then free to be used for other tasks. It also prevents fatigue of the arm that can occur when holding a telephone for extended periods of time. Furthermore, it is safer because the user's coordination and focus are enhanced for alternative purposes. This is of particular concern when the user is performing sports or recreational activities that require the continuous use of both hands, e.g. snow skiing, biking, or motorcycle riding to name a few. Finally, there is concern over the safety of radio waves emitted by cellular phones when the phones are in close proximity to the head of a user. Thus, the cellular telephone can be moved away from the user's head, thereby reducing the impact of such radiation.

Cellular telephones are often packaged with external speaker/microphone devices that allow for hands-free functionality. These devices are not always acceptable to the user. The devices often contain "ear-buds" that are uncomfortable and/or prone to disengaging with the ear and falling out, or otherwise of undesirable quality. As such, a variety of third-party products have been introduced to the market. Third-party products are produced with modified ear bud assemblies or headphones, and sometimes relocated microphones. Both wired and wireless (Bluetooth®) varieties are available.

There are three basic types of third-party devices available on the market. One type of device is a combination speaker/microphone unit connected wirelessly to the cellular telephone. A second type of device is a combination speaker/microphone unit connected to the cellular telephone using wires. A third type of device uses a wired configuration containing an integral microphone and headphone plug. This allows any standard headphone to be connected to the adapter cable, but has the drawback of requiring the use of the supplied microphone. This microphone may be inconvenient to the user due to its location along the adapter cable (including possibility of picking up excess background noise) or low quality.

A significant disadvantage of the available adapter cables is that they do not allow the use of third-party wired combination speaker/microphone units with standard, independent speaker and female phone jacks. These units are widely available for use in, among other things, communications via personal computer. Many users prefer specific devices due to comfort and functionality that suits their individual purposes. These devices cannot generally be connected to cellular telephones due to non-standard plug connections present on most models.

In particular, the Apple iPhone®, which has achieved enormous commercial success, uses a non-standard speaker/microphone female phone jack. No known adapters are available that provide standard female headphone jacks and microphone jacks to allow a standard combination speaker/microphone unit with independent male headphone and microphone plugs to be connected to an iPhone®.

Additionally, for certain sports and recreational activities where the user is in motion, many of the available devices are particularly problematic because the headsets may not be securely held in place, and free wires may snag on foreign objects such as tree branches in the vicinity of the user. In addition, microphone placement may be sub-optimal, even to the point of being non-functional, due to excessive wind noise or muffling due to the user's clothing blocking the microphone. Finally, while these devices are often equipped with remote buttons for answering incoming telephone calls, user interface with the button may be difficult due to the button's placement or configuration, especially if the user is wearing gloves or other clothing that may interfere with the operation. Answer buttons are typically very small, require a significant degree of dexterity to operate, and may even be difficult to locate in some circumstances. Due to operational difficulties, users of these devices may fail to answer incoming telephone calls that they wish to answer.

Certain devices adapted to specific sports or recreational activities have been developed to solve some of the above-mentioned issues. However, none of the presently known devices are universally adapted to a variety of non-related activities.

For instance, cold weather hats for use with, e.g. snow skiing, such as that disclosed in U.S. Pat. No. 4,982,451 to Graham, have been fitted with headphones and are connectable to portable music players. These hats are not, however, fitted with microphones and may not be connectable to cellular telephones for two-way communication. These hats are typically manufactured with heavy fabric well-suited for cold weather sports but ill-suited for warm weather activities.

Also in the prior art are helmet systems with integrated communications. U.S. Pat. No. 6,101,256 to Steelman discloses a motorcycle helmet with a built-in speaker and microphone, whereby the rider and passenger may communicate with one another. These devices are permanently mounted to the interior of the motorcycle helmet, and thus may not be adapted to uses that do not require use of the helmet.

Other known devices may have wider application but present some operational difficulties for use with sports activities. U.S. Pat. No. 6,069,964 to Yang discloses an earphone arrangement comprising a band traversing the back of the head to hold the speakers in place, and a boom microphone. This device may be less comfortable or secure than desired by a user performing sports or recreational activities, and the microphone will likely function inadequately in windy conditions.

There are no known existing solutions to address the difficulties of the present cellular telephone call answer buttons. "Walkie-talkie" type buttons, such as that depicted in International Patent Publication No. WO/2004/107787 of Bataillard, are typically mounted to the body of the transceiver or to a remote speaker/microphone device wired back to the transceiver. These devices are not ideally suited for sports and recreation activities. They are relatively bulky, heavy, and expensive to produce. Additionally, they would be more difficult to operate than the slap switch described herein.

What is needed, therefore, is a universal headset device functional for a variety of sports and recreational activities. The headset, speaker, and microphone should be securely held in place, even while the user is in motion. The microphone should be placed in a position that will enhance the pickup response while limiting the interference from, e.g. wind or clothing. A breakaway connector between the cellular telephone and headset would prevent potentially dangerous or destructive snags on foreign objects and further provide the user with the ability to disengage the headset portion from the remaining components of the device. The headset itself would secure the earphones and microphone in place on the wearer's head comfortably even while wearing a helmet or other headgear over it. Additionally, an answer button in the style of a "slap switch" should be included to facilitate its operation even while the user is wearing, e.g. heavy gloves. Ideally, this headset would be suitable for both cold and warm weather activities. Moreover, the headset could also be used to listen to music since many modern cellular telephones are also portable music players.

Additional functionality would be realized by incorporating an adapter cable that would allow the user to connect independent headphones and microphones of their choice to their cellular telephone. The slap switch may also be incorporated into the adapter. A further benefit would be provided by supplying "patch" cables that allow the adapter to be connected to a variety of common cellular telephone models.

In conclusion, insofar as I am aware, no cellular telephone headset system exists that meets the above design criteria, particularly in the configurations disclosed herein.

SUMMARY OF THE INVENTION

It is an object of the present invention to provide a cellular telephone headset with at least one speaker (and preferably two speakers for stereophonic music reproduction) and a microphone mounted within a universal helmet-liner suitable for use in conjunction with a variety of sports and recreational helmets and hats. The speaker and microphone are held in place by, e.g. a hook and loop fastening system (e.g., Velcro®) or stretchable fabric, so they may be removed to wash the helmet-liner. The helmet-liner is ideally constructed of a breathable material, making it suitable for warm weather use without overheating the user. The microphone is ideally placed on or near the chinstrap for optimum clarity and minimal wind and clothing interference. A noise canceling microphone may be provided, which is built into the chin strap so as to rest the microphone against the user's throat, thereby minimizing disturbances from external sources, such as wind. Other headgear, such as a motorcycle helmet, bicycle helmet, or ski hat may be placed over the helmet-liner, as desired by the user.

It is another object of the invention to enhance the ability of users to answer or end telephone calls while the user is in motion or wearing gloves that would render the use of conventional call answer buttons difficult or impossible. A telephone answer button in the style of a "slap switch" will avoid the need for the user to search for the button and fumble with the operation thereof. The call is answered by momentary shorting of the two wires leading to the microphone connection when the user slaps the switch. Ideally, the slap switch would be relatively large compared to prior art cellular telephone answer switches, but compact enough to avoid excessive bulkiness. An active area suitable for engaging the switch of at least one square inch is desired. Approximately four square inches is preferable, and the active area may range in sizes of nine square inches or larger. This eliminates the need for precision, thus making the device suitable for use with sports and recreational activities. The slap switch may be clipped onto the users clothing or placed inside a pocket, as desired.

It is another object of the invention to provide a breakaway collar connector between the helmet-liner and the slap switch to prevent snags. The breakaway connector comprises two "halves" containing a plurality of electrical contact elements and one or more magnets to hold the halves in place during normal operation. One half of the breakaway connector is wired to the slap switch and then from the slap switch to a cellular telephone connector tip. The other half of the breakaway connector is wired to the speakers and microphone of the headset.

It is another object of the present invention to provide an adapter comprising a standard (3.5-mm) female phone jack, with a cellular telephone audio input/output jack on the opposite end, which will allow operation with a standard headset of the user's choice. A slap switch may also be incorporated into the adapter. This will allow use of the slap switch with a user's preferred headset, in the case that the user selects a headset other than the head liner system described herein. Two independent connections are therefore provided: one standard headphone connector, and one standard microphone connector. These independent connections can be located adjacent to one another in a duplex arrangement or on separate wires branching off of the cellular telephone connection in a simplex arrangement.

It is yet another object of the present invention to provide "patch" cables to allow use of the headset device with different cellular telephone models, which may contain nonstandard audio input/output connections.

It is envisioned that the present invention could be configured to be adaptable to portable music players. An additional configuration of the device is for use with two-way portable radio communications. Law enforcement personnel, for instance, may find this embodiment to be particularly useful. Without limitation, these and other embodiments may be incorporated without departing from the spirit and scope of the present invention.

BRIEF DESCRIPTION OF THE DRAWINGS

These and other features and advantages of this invention will be more readily understood from the following detailed description of the various aspects of the invention taken in conjunction with the accompanying drawings in which.

Figure 1:
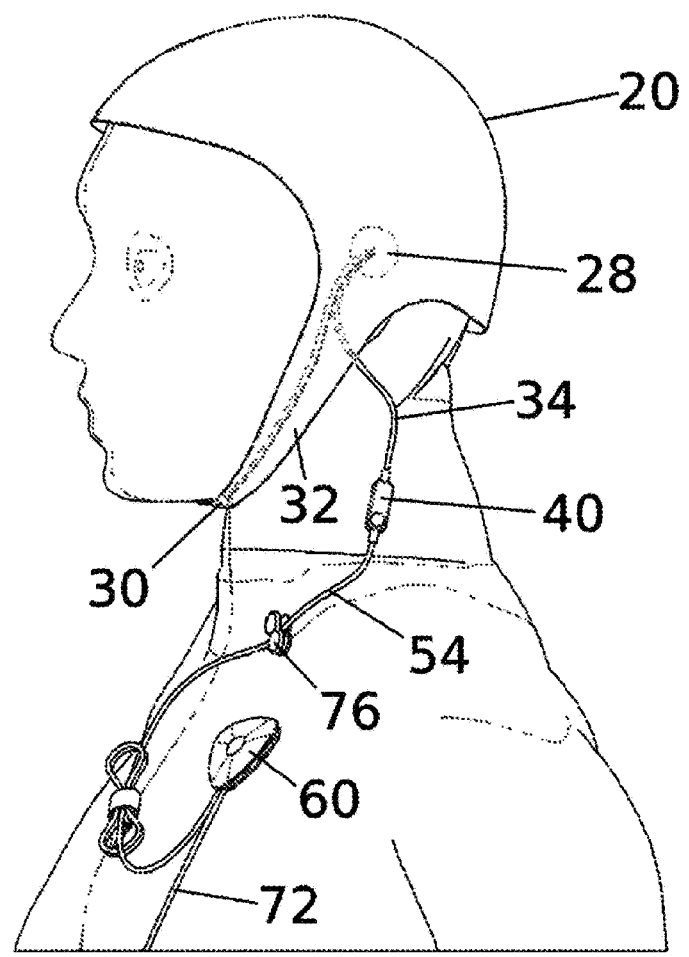
FIG. 1 is a perspective view of an embodiment of the present invention showing the headset worn by a user.

It is noted that the drawings of the invention are not to scale. The drawings are merely schematic representations, not intended to portray all specific parameters of the invention. The drawings are intended to depict only typical embodiments of the invention, and therefore should not be considered as limiting the scope of the invention. In the drawings, like numbering represents like elements among the drawings. In other words, for the sake of clarity and brevity, like elements and components of each embodiment bear the same designations throughout the description.

DETAILED DESCRIPTION OF THE INVENTION

FIG. 1 depicts helmet-liner 20 secured to a user's head, preferably through the use of a hook and loop fastener (e.g., Velcro®) connector on chinstrap 32 or other suitable means known in the art, such as stretchable fabric. Left and right speakers 28 are mounted within helmet-liner 20 in position next to the user's ears. (Only the left speaker is shown in FIG. 1). Microphone 30 is mounted within chin strap 32 near the user's chin. Connecting wires (not shown) for speakers 28 and microphone 30 are preferably contained within helmet-liner 20 and chin strap 32. Wire 34 connects speaker 28 and microphone 30 to breakaway connector 40. In a preferred embodiment, speakers 28, microphone 30, and connecting wires are contained in secure pockets of helmet-liner 20 but are removable by the user to facilitate washing of helmet-liner 20.

Breakaway connector 40 is designed to release wire 34 from wire 54 in the event that excessive tension is placed on the line (e.g., from a snag) or if the user desires to separate helmet-liner 20 and associated components from the remaining components of headset 10. Slap switch 60 is used to answer or hang up telephone calls and to start and stop music, and has the advantage of being easy to operate when the user is participating in sports or recreational activities, especially where the particular activity would render it difficult or impossible to toggle a micro switch. Slap switch 60 is connected to cellular telephone plug 74 by wire 72.

Figures 2, 3:
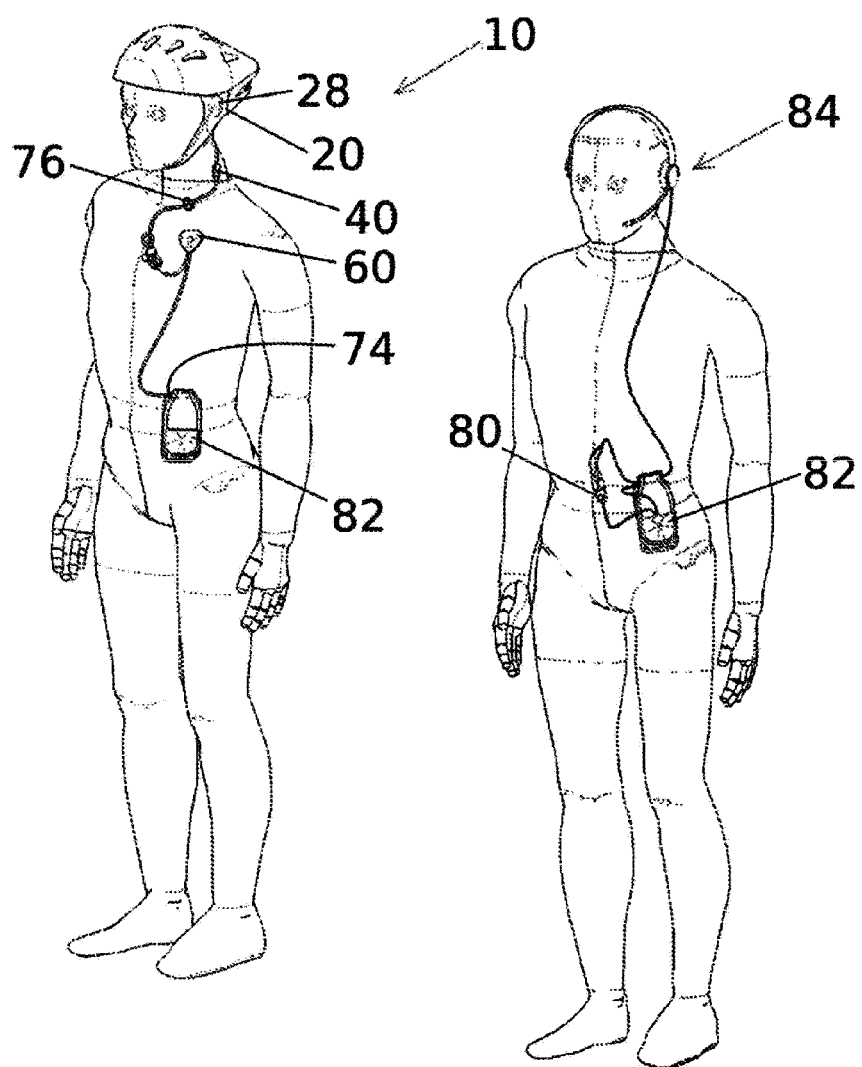
FIG. 2 is a perspective view of an embodiment of the present invention showing the headset worn by a user underneath a helmet.
FIG. 3 is a perspective view of an embodiment of the present invention showing use of the present invention in conjunction with a standard headset.

FIG. 2 depicts headset 10 secured to a user, with a sports helmet (not part of the present invention) worn over top of helmet-liner 20. Headset 10 comprises helmet-liner 20, breakaway connector 40, wire clip 76, slap switch 60, and cellular telephone plug 74. Use of the sports helmet is optional. Helmet-liner 20 may also be worn independently, if desired. An optional carrying case 82 (also not part of the present invention) encapsulates the cellular telephone.

FIG. 3 depicts another embodiment of the present invention. Again, an optional carrying case 82 is shown. Female duplex plug 80 comprises standard (3.5-mm) headphone and microphone connections. Female duplex plug 80 may alternatively be comprised of two simplex plugs. User-selected headset 84 (not part of the present invention) is worn by the user and connected to female duplex plug 80. Not depicted in FIG. 3, but contained within a pouch that is part of optional carrying case 82, is slap switch 60. Slap switch 60 may also be attached to a user's clothing as shown in FIG. 2. A breakaway connector may also be provided with this arrangement. Similarly, standard 3.5-mm speaker and microphone connections, as shown in FIG. 3, may be incorporated into the headset system of FIG. 2. The resulting system would, therefore, be compatible both with helmet-liner 20 and a standard headset selected by the user, thereby allowing the user to select the most suitable headset arrangement for a given situation.

Figure 4:
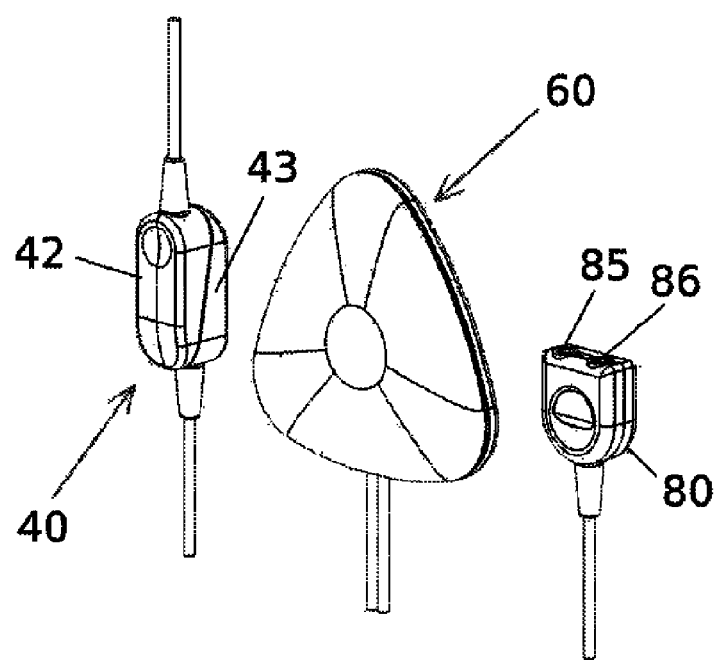
FIG. 4 is a perspective view of the breakaway connector, the slap switch, and the duplex female phone jack.

FIG. 4 shows a perspective view of breakaway connector 40, slap switch 60, and female duplex plug 80. Breakaway connector 40 comprises male connector 42 and female connector 43 with internal electrical contacts and retaining magnets. Slap switch 60 is shown in a substantially triangular shape, although one skilled in the art can appreciate that a variety of shapes are possible. Female duplex plug 80 comprises speaker plug 85 and microphone plug 86. An alternative embodiment employs two female simplex plugs in place of female duplex plug 80.

Figure 5:
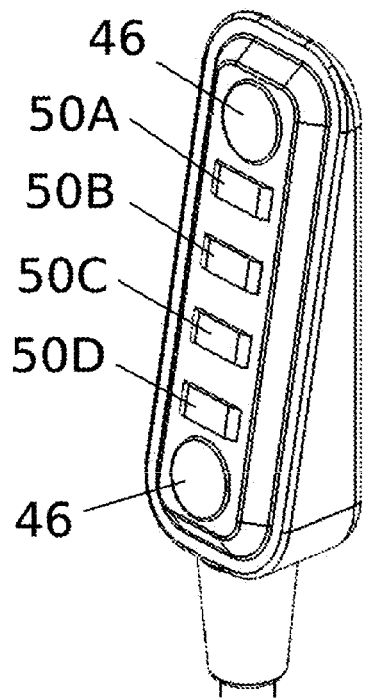
FIG. 5 is a perspective view showing the male half of the breakaway connector.

FIG. 5 shows male connector 42 of breakaway connector 40. Male connector 42 comprises magnets 46 and electrical prongs 50A, 50B, 50C, and 50D. Female connector 43 (not shown) is configured to mate with male connector 42, and contains magnets or metallic plates that correspond in position to magnets 46 to hold both connector halves in place during normal operation. Also, electrical recesses are included to mate with male prongs 50A, 50B, 50C, and 50D to close the electrical connections between mating segments of breakaway connector 40.

Figure 6:
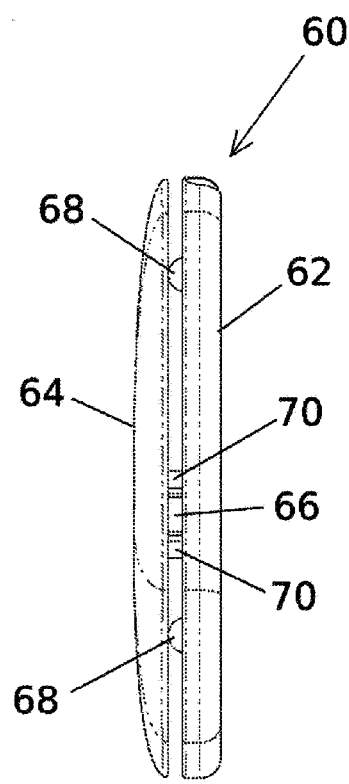
FIG. 6 is a side view of the slap switch.

FIG. 6 depicts an embodiment of slap switch 60. Electrically parallel switches 68, positioned between base 62 and slap pad 64, are functional for answering or hanging up cellular telephone calls when depressed, or for starting, stopping, and resuming music. The location of switches 68 near the perimeter of slap pad 64 facilitates their operation when force is applied to slap pad 64 at irregular positions or angles. Switches 68 are normally held open by, e.g. springs or elastomeric materials of construction that apply a force opposing the internal electrical switch contacts (not pictured). Support guides 66 and 70 hold base 62 and slap pad 64 together and allow for a limited degree of swiveling to close one or more electrical switches 68 when slap switch 60 is activated by the user. Wires 54 and 72 (not shown on FIG. 6) are attached to base 62.

Figure 7:
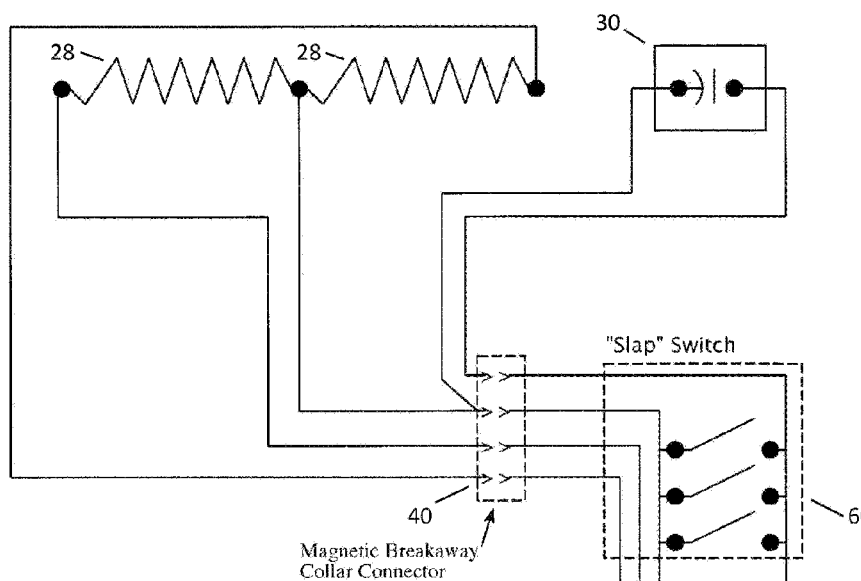
FIG. 7 is a schematic wiring diagram of the embodiment depicted in FIG. 1.

FIG. 7 shows the schematic wiring of the embodiment presented in FIG. 1 and FIG. 2. Slap switch 60 is shown with three parallel electrical switches, which may be appropriate for a triangular-shaped slap switch. This is not to be construed as limiting the present invention, as any reasonable number of parallel switches, or a single switch, may be used with this device. Cellular telephone plug 74 comprises electrical contacts 90A, 90B, 90C, and 90D that mate with internal electrical contacts of a cellular telephone. The contacts 90A-D are electrically connected to speakers 28 and microphone 30 via insulated conductors in the manner shown. Slap switch 60 is a resilient switch that remains in the open position, as shown, when not pressed by the user to activate. When slap switch 60 is pressed, at least one of parallel electrical switches 68 close to complete an electrical circuit and short out the leads across microphone 30. This activates functions on the cellular telephone. Specifically, it answers and hangs up telephone calls, or starts, stops, and resumes music play. Use of slap switch 60 may also activate other functions on the phone, such as starting and stopping the streaming of music to speakers 28.

Figure 8:
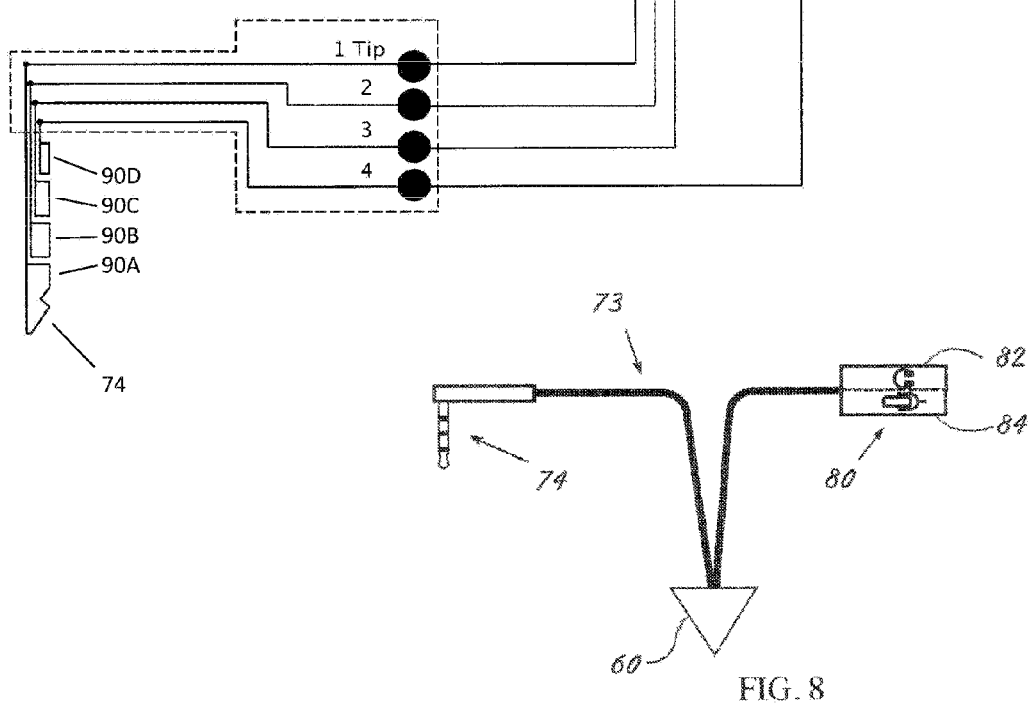
FIG. 8 is a schematic diagram of the embodiment depicted in FIG. 3.

FIG. 8 depicts adapter 73 with a standard 3.5-mm, four-connector, male plug for insertion into many cellular telephone models. At the opposite end of adapter 73 is female duplex plug 80 (or, alternatively, two female simplex plugs) for connection to a variety of standard headsets. Slap switch 60 is included to facilitate starting, stopping, and resuming music play, and answering and ending cellular telephone calls.

Figure 9:
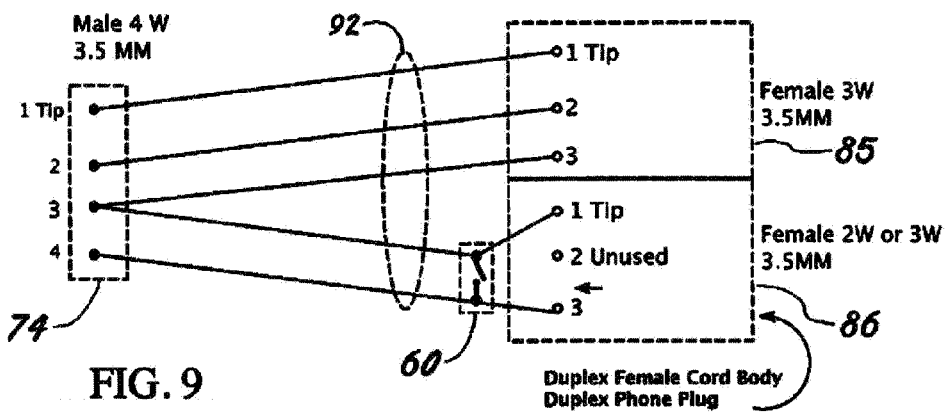
FIG. 9 is a schematic wiring diagram of the embodiment depicted in FIG. 3 utilizing a duplex-type speaker and microphone connection.

FIG. 9 depicts the wiring system for connection of a cellular telephone to a standard headset, or alternatively to one or more speakers and a microphone with standard 3.5-mm male plugs. Cellular telephone plug 74 is electrically connected to speaker plug 85 and microphone plug 86 via insulated conductors 92, in the manner shown. Female duplex plug 80 comprises speaker plug 85 and microphone plug 86, which are both standard 3.5-mm female jacks. Slap switch 60 may be activated to momentarily short the leads across the microphone terminals, as described herein.

Figure 10:
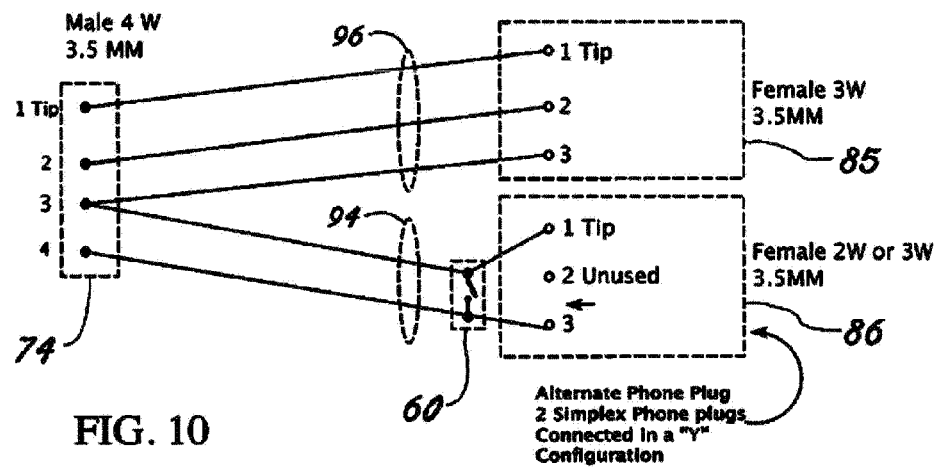
FIG. 10 is a schematic wiring diagram of the embodiment depicted in FIG. 3 utilizing two simplex-type speaker and microphone connections.

FIG. 10 shows an electrically equivalent arrangement as that depicted in FIG. 9, but with speaker plug 85 and microphone plug 86 arranged in a simplex configuration. Cellular telephone plug 74 is electrically connected to speaker plug 85 via insulator conductor 94, and to microphone plug 86 via insulated conductor 96.

Operation

In operation, cellular telephone plug 74 is inserted into a cellular telephone female audio input/output connection. Alternatively, a patch cable may be used to translate a non-standard cellular telephone connection to a standard 3.5-mm plug, and cellular telephone plug 74 may then be inserted into a female plug of the patch cable. Helmet-liner 20 is worn over the user's head, and male segment 42 is engaged with female segment 43 of breakaway connector 40. Many modern cellular telephones can send an audio (e.g., music) signal to speakers 28. Generally, an audible signal will be transmitted on top of the audio signal when the user receives an incoming telephone call. The user may then momentarily activate slap switch 60 to answer the call, and activate it again to hang up. Alternatively, when the cellular telephone is being utilized as a portable music player, slap switch 60 is used to start, stop, and resume music play.

Operation for the configuration depicted in FIG. 2 is similar. Male speaker and microphone plugs are inserted into female speaker plug 85 and microphone plug 86, respectively. The operation of slap switch 60 is as described above.

Since other modifications and changes to the novel headset will be apparent to those skilled in the art, the invention is not considered limited to the description above for purposes of disclosure, and covers all changes and modifications which do not constitute departures from the true spirit and scope of this invention.

Having thus described the invention, what is desired to be protected by Patent is presented in the subsequently appended claims.

I claim:

1. An apparatus to control a portable electronic device, said apparatus comprising:
    A. a head covering comprising a strap, said strap integrally formed with said head covering and in contact with the throat of a user;
    B. a flexible wire harness electrically and mechanically interconnecting:
        i. a microphone,
        ii. one or more speaker(s),
        iii. a breakaway connector disposed between separable portions of said flexible wiring harness, said breakaway connector comprising two cable terminations with essentially planar contact surfaces comprising more than one electrical connection and one or more magnetic contacts, said cable terminations configured to engage said electrical connections and magnetic contacts with said planar contact surfaces at an acute angle to the orientation of the wiring harness when said wiring harness is taut,
        iv. a mechanical control switch assembly comprising more than one mechanical switch wherein each of said more than one mechanical switches provide an identical switching function and are disposed so that actuation of the mechanical control switch assembly at an arbitrary position or angle causes at least one of the more than one mechanical switches to operate,
        v. one or more plug(s) mechanically and electrically connected to a portable electronic device;
    wherein the apparatus is configured to:
        a. permit removable attachment of the microphone to or within said strap;
        b. permit removable attachment of the one or more speaker(s) to or within said head covering,
        c. provide audio output from the portable electronic device to the one or more speaker(s) via the flexible wire harness,
        d. provide audio input to the portable electronic device via the microphone and the flexible wire harness,
        e. activate a first function of the portable electronic device via the flexible wire harness upon a first actuation of the mechanical control switch assembly, thereby causing at least one of the more than one mechanical switches to be activated, and
        f. activate a second function of the portable electronic device via the flexible wire harness upon a second actuation of the mechanical control switch assembly, thereby causing at least one of the more than one mechanical switches to be activated.

2. The apparatus of claim 1 wherein the said head covering comprises a fabric head covering.

3. The apparatus of claim 1 wherein the breakaway connector is further configured to disengage the essentially planar contact surfaces when subjected to tension, either when inadvertently imposed or when intentionally imposed by the user.

4. The apparatus of claim 1 wherein the essentially planar contact surfaces of the two cable terminations are configured to permit mechanical and electrical connection via magnetic coupling in the orientation that aligns the more than one electrical connections to provide audio output from the portable electronic device to the one or more speaker(s) and to provide audio input to the portable electronic device from the microphone.

5. The apparatus of claim 1 wherein said portable electronic device is one of a telephone, a music player, or two-way communication radio.

6. The apparatus of claim 1 wherein said one or more plug(s) are simplex plug(s) or duplex plug(s).

7. The apparatus of claim 1 wherein said one or more speaker(s) are removably attached to said head covering using hook-and-loop fasteners.

8. The apparatus of claim 1 wherein the first function of the portable electronic device comprises answering a telephone call.

9. The apparatus of claim 1 wherein the second function of the portable electronic device comprises terminating a telephone call.

10. The apparatus of claim 1 wherein the first function of the portable electronic device comprises stopping audio output from said electronic device.

11. The apparatus of claim 1 wherein the second function of the portable electronic device comprises starting or resuming audio output from the electronic device.

12. A method of controlling a portable electronic device, the method comprising:
   A. providing the portable electronic device;
   B. providing a head covering comprising a strap integrally formed with said head covering and in contact with the throat of a user;
   C. providing a first portion of a flexible wire harness comprising
      i. a first magnetic cable termination comprising an essentially planar contact surface,
      ii. a microphone removably disposed within or removably attached to said strap and mechanically and electrically connected to said first magnetic cable termination via said first portion of the flexible wire harness, and
      iii. one or more speaker(s) removably disposed within or removably attached to said head covering and mechanically and electrically connected to said first magnetic cable termination via said first portion of the flexible wire harness;
   D. providing a second portion of the flexible wire harness comprising
      i. a second magnetic cable termination comprising an essentially planar contact surface,
      ii. a mechanical control switch assembly comprising more than one mechanical switch all configured to perform an identical switching function and disposed such that an activation force applied to said assembly at an arbitrary position or angle will cause at least one of the more than one electrical switches to operate, said mechanical switch assembly mechanically and electrically connected to said second magnetic cable termination via said second portion of the flexible wire harness, and
      iii. one or more plug(s) mechanically and electrically connected to said portable electronic device and mechanically and electrically connected to said control switch assembly via said second portion of the flexible wire harness;
   E. mechanically and electrically connecting said first portion of the flexible wire harness to said second portion of the flexible wire harness by magnetically coupling the essentially planar contact surfaces of the first magnetic cable termination and the second magnetic cable termination at an acute angle to the orientation of the wiring harness when said harness is taut;
   F. electrically communicating audio from said portable electronic device to said user via said second portion of the flexible wire harness, said first portion of the flexible wire harness, and said one or more speaker(s);
   G. electrically communicating audio from said microphone to said portable electronic device via said first portion of the flexible wire harness and said second portion of the flexible wire harness;
   H. activating a first function of the portable electronic device by providing a first actuation force to the surface of the mechanical control switch assembly, thereby causing at least one of said more than one mechanical switches to operate; and
   I. activating a second function of the portable electronic device by providing a second actuation force to the surface of the mechanical control switch assembly, thereby causing at least one of said more than one mechanical switches to operate.

13. The method of claim 12 wherein said portable electronic device is one of a telephone, a music player, or two-way communication radio.

14. The method of claim 12 wherein the first function of the portable electronic device comprises answering a telephone call.

15. The method of claim 12 wherein the second function of the portable electronic device comprises terminating a telephone call.

16. The method of claim 12 wherein the first function of the portable electronic device comprises stopping audio output from said electronic device.

17. The method of claim 12 wherein the second function of the portable electronic device comprises starting or resuming audio output from the electronic device.

18. A mechanical audio control switch assembly, said assembly comprising:
   A. a generally planar upper surface forming a slap pad and a generally planar lower surface forming a base, said slap pad and base being framelessly interconnected by two or more support guides disposed between the slap pad and the base within the periphery thereof and configured to allow only a limited degree of movement therebetween;
   B. springs or elastomeric material disposed between the slap pad and the base so as to hold the slap pad and base apart when no external force is applied to either surface;
   C. more than one electrical switch, all electrically configured to provide identical functionality and disposed between the slap pad and the base such that an activation force applied to the slap pad at an arbitrary position or angle will cause at least one of said more than one electrical switches to operate; and
   D. two or more wired connections, each of said wired connections in audio signal or control signal communication with any of a portable electronic device, one or more speaker(s), and a microphone.

19. The mechanical audio control switch assembly of claim 18 wherein said portable electronic device is one of a telephone, a music player, or two-way communication radio.

20. The mechanical audio control switch assembly of claim 18 wherein said audio or control communication comprises any of:
   A. communication of audio signals from said portable electronic device to said one or more speaker(s);
   B. communication of audio signals from said microphone to said portable electronic device; or
   C. communication of control signals from any of said more than one electrical switch to said portable electronic device.

* * * * *